(12) United States Patent
Kim

(10) Patent No.: US 8,762,398 B2
(45) Date of Patent: Jun. 24, 2014

(54) METHOD OF INTEGRATING DATA OF XML DOCUMENT WITH DATABASE ON WEB

(75) Inventor: Youngkun Kim, Hanam-Si (KR)

(73) Assignee: Chun Gi Kim, Gyeongsangbuk-do (KR)

( * ) Notice: Subject to any disclaimer, the term of this patent is extended or adjusted under 35 U.S.C. 154(b) by 0 days.

(21) Appl. No.: 13/398,668

(22) Filed: Feb. 16, 2012

(65) Prior Publication Data

US 2013/0144896 A1  Jun. 6, 2013

(51) Int. Cl.
*G06F 7/00* (2006.01)

(52) U.S. Cl.
USPC .......................................................... 707/756

(58) Field of Classification Search
USPC .......................................................... 707/756
See application file for complete search history.

(56) References Cited

U.S. PATENT DOCUMENTS

2003/0046317 A1\*  3/2003  Cseri et al. ..................... 707/513
2005/0010896 A1\*  1/2005  Meliksetian et al. ......... 717/106

FOREIGN PATENT DOCUMENTS

| JP | 2006-139764 | 6/2006 |
|---|---|---|
| JP | 2011-154653 | 8/2011 |
| JP | 2011-165160 | 8/2011 |
| JP | 2011-181106 | 9/2011 |
| KR | 10-2001-0017631 | 7/2001 |
| KR | 20030092525 | 12/2003 |
| KR | 10-2009-0066036 | 12/2007 |

\* cited by examiner

*Primary Examiner* — Apu Mofiz
*Assistant Examiner* — Ajith Jacob
(74) *Attorney, Agent, or Firm* — Klarquist Sparkman, LLP

(57) ABSTRACT

Disclosed herein is a method of integrating data of an XML document with a DB on a web. In the method, an XML document provided with user-defined tags is designed. An XSL format document for normal data mapping and an XSL format document for repetitive data mapping are designed. Mapping information required to map the normal data and the repetitive data of the XML document to the XSL format document for normal data mapping and the XSL format document for repetitive data mapping is created. An XSL document for normal data mapping and an XSL document for repetitive data mapping are generated using the mapping information. An SQL query statement required to integrate the normal data and the repetitive data of the XML document with a DB is generated. Data of the XML document is integrated with the DB by executing the SQL query statement on the DB.

15 Claims, 14 Drawing Sheets

Fig.14 MAPPING XSL DOCUMENT FOR NORMAL DATA STORAGE

MAPPING XSL DOCUMENT FOR NORMAL DATA REVISION

Fig.16 MAPPING XSL DOCUMENT FOR REPETITIVE DATA STORAGE

MAPPING XSL DOCUMENT FOR REPETITIVE DATA REVISION

METHOD OF INTEGRATING DATA OF XML DOCUMENT WITH DATABASE ON WEB

BACKGROUND OF THE INVENTION

1. Field of the Invention

The present invention relates generally to a method of integrating the data of an Extensible Markup Language (XML) document with a database (DB) on a web and, more particularly, to a method of integrating the data of an XML document with a DB on a web, which can dynamically integrate the data of an XML document with a DB on a web using an XML replacement technology.

2. Description of the Related Art

Generally, markup language refers to a series of characters or symbols inserted into specific locations so as to reveal a way in which a relevant file is to be output through a printer or a form in which the file is to be viewed on a screen. Well-known markup languages include Standard Generalized Markup Language (SGML) and HyperText Markup Language (HTML).

SGML is a markup language mainly for efficiently transmitting, storing and automatically processing multimedia electronic documents between different heterogeneous systems without causing the loss of information. HTML is a markup language mainly for describing hypermedia documents used on the Internet.

SGML is disadvantageous in that even if it has various functionalities, as described above, it is difficult to use the SGML and it is not easy to generate and understand a document type definition (hereinafter referred to as "DTD"). Further, HTML is disadvantageous in that even if it is simple and is easily used, HTML is a fixed markup language defined by SGML, and thus it is difficult to incorporate the variety of and dynamic characteristics of the web.

In order to compensate for the disadvantages of existing markup languages, an extensible markup language (hereinafter referred to as "XML") has been proposed. XML is a next generation Internet standard language proposed by the World Wide Web Consortium (W3C) in 1996 and adopted as a recommended standard by the W3C in the spring of 1998.

XML is a meta-language generated by improving the simple representational functions of HTML, collecting only the practical functions of SGML and then simplifying them. This XML is one of Internet standard languages that are currently receiving attention thanks to its various advantages such as the advantage of having excellent compatibility with other languages, being easy to create, and having a DTD for verifying a data format and tools for supporting the DTD, and the advantage of a tag being closely related to the contents of a document so that an XML file itself may function as a single desirably designed DB.

That is, to date, HTML which has been most widely used as a content representation language on the Internet, is suitable for the functionality of representation, but has limitations when desiring to reuse or search for documents. Thus, as a next-generation Internet language for solving these limitations, XML that is a language enabling the scalability, compatibility, and information structurization has received attention.

Meanwhile, a database (DB) is a structure of data stored depending on specific relationships that reflect the meaning of data. Such a DB, as storage of information, is used by a large number of application programs, and thus the structure of a DB must be able to be changed without the revision of application programs.

In the prior art, there are problems in that a DB must be newly created to store XML documents in the DB, and XML documents having the same DTD must be stored in the table of the newly created DB, and in that when, in particular, the schema structures of DBs storing XML documents are different from one another, the data of an existing DB may not be used, or the data of the existing DB that has already been constructed must be migrated to the new DB.

In order to solve these problems, research has been conducted into technology in which the information of a DB is converted into a document using XML and the document represented by XML is stored easily in the DB, by generating mapping rules between the DTD of the XML document and the schema of the DB, converting the XML document into the DB in compliance with the generated mapping rules and then storing the DB, and by converting information stored in the form of the DB back into the XML document.

In detail, technology entitled "method of storing and managing an XML document and a medium for storing software programmed to perform the same" is disclosed in Korean Patent Application No. 10-2001-0017631. This patent proposes a method of storing and managing an XML document, which performs mapping between the schema structure of a DB that has been previously constructed and used and DTD documents defining the structure of an XML document, thus performing storage and searching in conjunction with even the DB of schema types that were used previously.

Further, in the prior art, as the requirements of users related to application programs are diversified, there are a large number of types and quantities represented by XML documents, so that there is a problem in that it is difficult for a system, in which a single DB server processes the requests of all users, to promptly cope with the requests of the users to make a response.

In order to solve this problem, research has been conducted into technology which enables pieces of XML data managed by a source DB to be duplicated to another server which is physically different from a source server without any loss of the meanings of structural information and attribute information contained in an original XML document as well as the contents of the original XML document.

In detail, technology entitled "apparatus and method for duplicating an XML document to a remote server without any loss of the structural and attribute information of the XML document" is disclosed in Korean Patent Application No. 10-2003-0092525. This patent proposes a method which can process the service requests of application programs by distributing users' queries that have been concentrated on a source server into a plurality of duplication servers while allowing even each duplication server to support searching based on the contents and attributes provided by an XML query language, through the use of characteristics of the structural and attribute information included in each XML document being maintained without change when duplicating the XML document stored in the DB of the source server to the DB of the duplication server.

However, the above patents are problematic in that promptness is low when the data of each XML document is stored in the DB and in that when errors are caused in a storage procedure, a DB having low accuracy may be constructed. Therefore, the inventor of the present invention has completed the invention related to a scheme capable of immediately integrating an XML document on a web with a DB using mapping information upon integrating data while conducting research into technology for integrating data with a DB using data mapping between XML/Extensible Stylesheet Language (XSL) documents so as to solve the above problem.

SUMMARY OF THE INVENTION

Accordingly, the present invention has been made keeping in mind the above problems occurring in the prior art, and an object of the present invention is to provide a method of integrating the data of an XML document with a DB on a web, which can dynamically integrate the data of an XML document with a DB by storing the data of the XML document in the DB or by revising the DB using the data of the XML document on the web, on the basis of an XML replacement technology rather than a Document Object Model (DOM).

In order to accomplish the above object, the present invention provides a method of integrating data of an Extensible Markup Language (XML) document with a database (DB) on a web, including designing an XML document provided with user-defined tags, designing an Extensible Stylesheet Language (XSL) format document for normal data mapping, which is used when mapping normal data among structural data of the XML document, and an XSL format document for repetitive data mapping, which is used when mapping repetitive data, creating mapping information required to map the normal data and the repetitive data of the XML document to the XSL format document for normal data mapping and the XSL format document for repetitive data mapping, respectively, designing an XSL document for normal data mapping to which the normal data is mapped and an XSL document for repetitive data mapping to which the repetitive data is mapped, by mapping the normal data and the repetitive data of the XML document to the XSL format document for normal data mapping and the XSL format document for repetitive data mapping, respectively, using the mapping information, generating a Structured Query Language (SQL) query statement required to integrate the normal data and the repetitive data of the XML document with a DB associated with the XML document on the web by performing Extensible Stylesheet Language Transformation (XSLT) on the XML document and the XSL documents for mapping using an XSL transformer, and integrating data of the XML document with the DB by executing the SQL query statement on the DB.

Preferably, the designing the XML document may include defining an XML document including a preset structure and preset data using the user-defined tags, and separating the XML document into an XML document for normal data mapping, which is used when mapping the normal data, and an XML document for repetitive data mapping, which is used when mapping the repetitive data.

Preferably, at the defining the XML document, the XML document may be implemented such that an absolute path of the user-defined tags is stored as user-defined tag values using an XML tree structure.

Preferably, at the defining the XML document, when the normal data and the repetitive data that are pieces of structural data of the XML document are indicated on user-defined tag values, they may be separately indicated using different indication methods so that the normal data and the repetitive data can be distinguished from each other.

Preferably, at the defining the XML document, when the user-defined tags of the XML document are defined, if the structural data of the XML document is repetitive data, the repetitive data is differently indicated by attributes.

Preferably, at the defining the XML document, when attributes of the XML document are defined, the attributes may be indicated such that names of the attributes are combined with the user-defined tag values.

Preferably, the designing the XSL format document for mapping may include designing the XSL format document for normal data mapping, and designing the XSL format document for repetitive data mapping, wherein the XSL format document for normal data mapping may include a mapping XSL format document for normal data storage and a mapping XSL format document for normal data revision, and wherein the XSL format document for repetitive data mapping may include a mapping XSL format document for repetitive data storage and a mapping XSL format document for repetitive data revision.

Preferably, each of the mapping XSL format document for normal data revision and the mapping XSL format document for repetitive data revision may include a primary key required to retrieve the information of the DB.

Preferably, at the designing the XSL format document for mapping, the XSL format document for mapping may be stored after replacement parts of data have been modified into a specific format so that the replacement parts are sequentially replaced depending on the mapping information.

Preferably, at the creating the mapping information, the mapping information may include a data variable, a data type, and a mapping sequence.

Preferably, the data variable may be XML path information.

Preferably, the designing the XSL document for mapping may include designing the XSL document for normal data mapping, and designing the XSL document for repetitive data mapping, wherein the XSL document for normal data mapping may include a mapping XSL document for normal data storage and a mapping XSL document for normal data revision, and wherein the XSL document for repetitive data mapping may include a mapping XSL document for repetitive data storage and a mapping XSL document for repetitive data revision.

Preferably, each of the mapping XSL document for normal data revision and the mapping XSL document for repetitive data revision may include a primary key required to retrieve the information of the DB.

Preferably, the generating the SQL query statement may include generating a storage SQL query statement required to store the normal data and the repetitive data of the XML document in the DB, and generating a revision SQL query statement required to revise the DB using the normal data and the repetitive data of the XML document.

Preferably, the integrating the data of the XML document with the DB may include storing the normal data and the repetitive data in the DB by executing the storage SQL query statement, and revising the DB using the normal data and the repetitive data by executing the revision SQL query statement.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
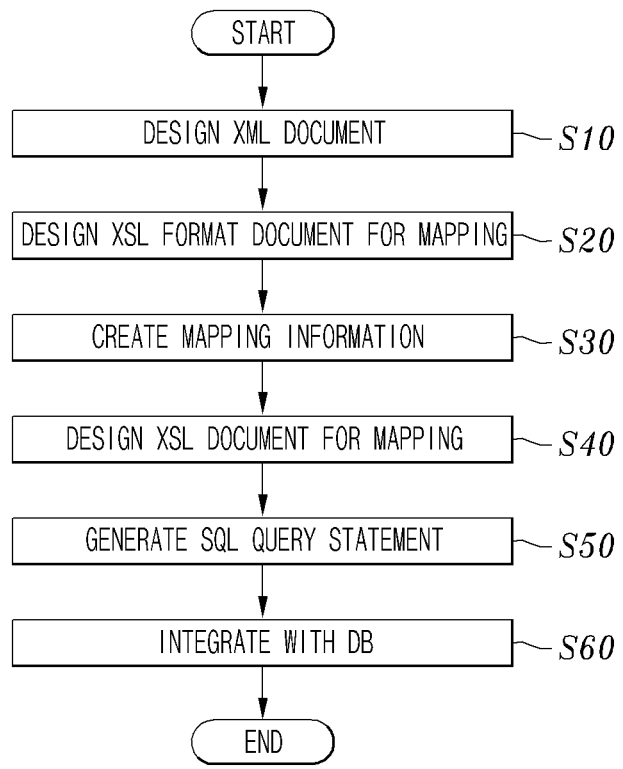
FIG. 1 is a flowchart showing a method of integrating the data of an XML document with a DB on a web according to the present invention.

Hereinafter, embodiments of the present invention will be described in detail with reference to the attached drawings. Reference now should be made to the drawings, in which the same reference numerals are used throughout the different drawings to designate the same or similar components. If in the specification, detailed descriptions of well-known functions or configurations may unnecessarily make the gist of the present invention obscure, the detailed descriptions will be omitted.

Figure 7:
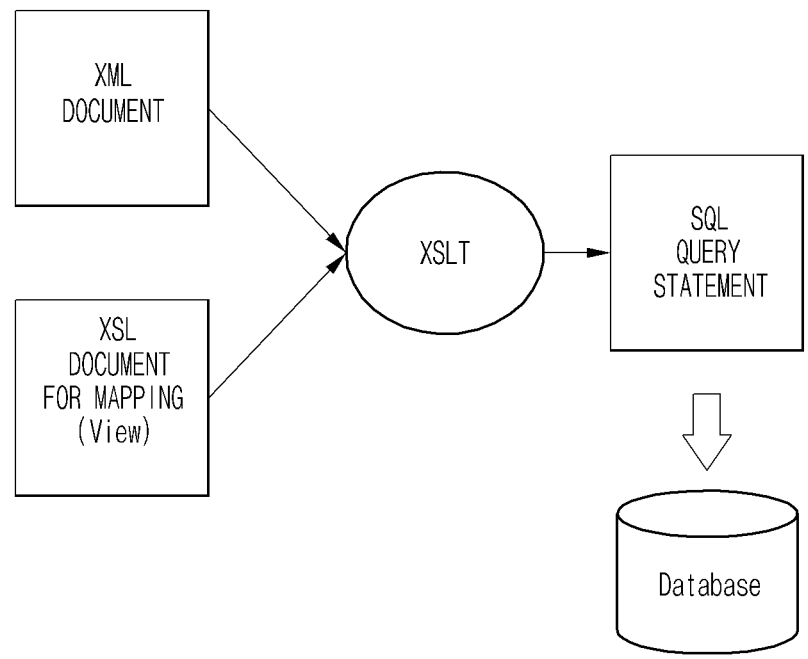
FIG. 7 is a diagram schematically showing a method of integrating the data of an XML document with a DB on a web according to the present invention.

FIG. 7 is a diagram schematically showing a method of integrating the data of an Extensible Markup Language (XML) document with a DB on a web according to the present invention.

As shown in FIG. 7, the present invention relates generally to a technology for integrating the data of an XML document with a DB on a web by mapping the data of the XML document using an XML replacement technology and, more particularly, to a technology for integrating the data of an XML document with a DB by storing the structural data of an XML document having tags defined by a user in the DB or by revising the DB using the structural data of the XML document.

The present invention may generate a Structured Query Language (SQL) query statement required to integrate the normal data and the repetitive data of an XML document with the DB by performing Extensible Stylesheet Language Transformation (XSLT) on an XML document and XSL documents for mapping. Thereafter, the present invention may integrate the data with the DB by executing the SQL query statement.

Such an XML document received on the web may be dynamically integrated with the DB on the web according to the present invention.

FIG. 1 is a flowchart showing a method of integrating the data of an XML document with a DB on a web according to the present invention.

The method of integrating the data of the XML document with the DB on the web according to the present invention includes an XML document design step S10, the step S20 of designing an XSL format document for mapping, a mapping information creation step S30, the step S40 of designing an XSL document for mapping, a Structured Query Language (SQL) query statement generation step S50, and a DB integration step S60.

The XML document design step S10 is the step of designing an XML document provided with user-defined tags.

Figure 2:
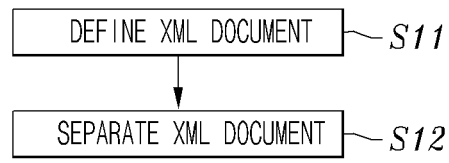
FIG. 2 is a flowchart showing an XML document design step according to the present invention.

FIG. 2 is a flowchart showing the XML document design step according to the present invention.

As shown in FIG. 2, the XML document design step S10 includes an XML document definition step S11 and an XML document separation step S12.

The XML document definition step S11 is the step of defining an XML document including a preset structure and preset data using the user-defined tags.

Figure 8:
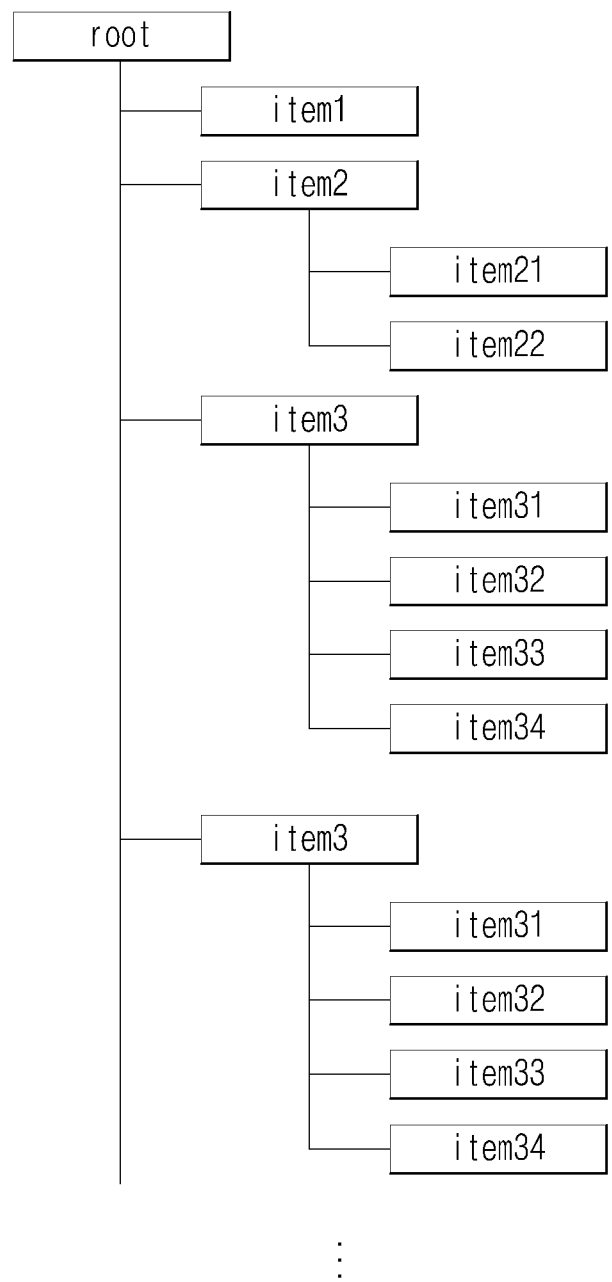
FIG. 8 is a diagram showing the data structure of an XML document according to the present invention.

FIG. 8 is a diagram showing the data structure of an XML document according to the present invention.

At the XML document definition step S11, the XML document may store the absolute path of the user-defined tags as user-defined tag values using an XML tree structure.

In detail, the XML document having the data structure of FIG. 8 can be created as the following XML document.

```
<root>
    <item1 attr="H_root/item1/@attr">H_root/item1</item1>
    <item2>
        <item21
attr="H_root/item2/item21/@attr">H_root/item2/item21</item21>
        <item22
attr="H_root/item2/item21/@attr">H_root/item2/item22</item22>
    </item2>
    <item3>
        <item31 repeat="y"> H_LIST_root/item3/item31</item31>
        <item32 repeat="y">H_LIST_root/item3/item32</item32>
    </item3>
</root>
```

In this case, when normal data and repetitive data which are pieces of structural data of the XML document are indicated on the user-defined tag values, the normal data and the repetitive data may be separately indicated using different indication methods so that the normal data can be distinguished from the repetitive data.

In detail, when normal data and repetitive data are indicated on the user-defined tag values, it is preferable to differently indicate the normal data and the repetitive data in such a way that the normal data is indicated by "H_" and the repetitive data is indicated by "H_LIST".

Further, when the user-defined tags of the XML document are defined, if the structural data of the XML document is repetitive data, the repetitive data may be differently indicated by attributes.

In detail, when the user-defined tags of the XML document are defined, the repetitive data is preferably differently indicated by the attribute "repeat=y".

Furthermore, when the attributes of the XML document are defined, it is possible to combine attribute names with user-defined tag values and then indicate the combined results.

In detail, when the attributes of the XML document are defined, it is preferable to combine the attribute name "attr" with the user-defined tag value "H_root/item1" and to indicate the attribute by the combined result "H_root/item1/@attr".

The following Table 1 shows examples of a user-defined tag and a tag value based on the data type of the XML document defined at the XML document definition step S11, as described above.

TABLE 1

| Data type | Identify | Tag | Tag value |
|---|---|---|---|
| Normal data | | <item1> | H_root/item1 |
| Attribute | | Attr | H_root/item1/@attr |
| Repetitive data | Repeat = "y" | <item31 repeat ="y"> | H_LIST_root/item3/item31 |

The XML document separation step S12 is the step of separating the XML document into an XML document for normal data mapping, which is used when mapping normal data, and an XML document for repetitive data mapping, which is used when mapping repetitive data.

The step S20 of designing the XSL format document for mapping is the step of designing an XSL format document for normal data mapping, which is used when mapping the normal data among the structural data of the XML document, and an XSL format document for repetitive data mapping, which is used when mapping the repetitive data.

Figure 3:
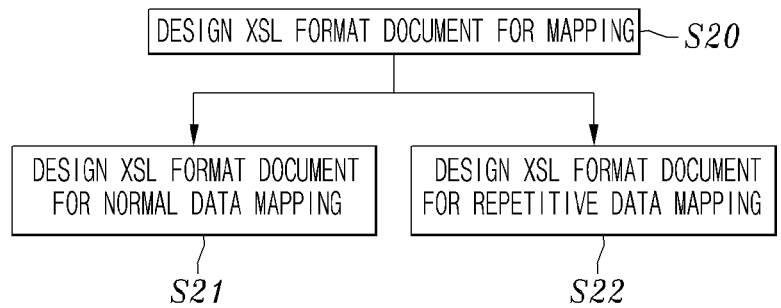
FIG. 3 is a flowchart showing the step of designing an XSL format document for mapping according to the present invention.

FIG. 3 is a flowchart showing the step of deigning the XSL format document for mapping according to the present invention.

As shown in FIG. 3, the step S20 of designing the XSL format document for mapping includes the step S21 of designing an XSL format document for normal data mapping and the step S22 of designing an XSL format document for repetitive data mapping.

The step S21 of designing the XSL document for normal data mapping is the step of designing an XSL format document for normal data mapping, which is used when mapping the normal data among the structural data of the XML document. The XSL format document for normal data mapping is given as follows.

```
<?xml version="1.0" encoding="UTF-8"?>
<xsl:stylesheet xmlns:xsl="http://www.w3.org/1999/XSL/Transform"
version="1.0">
<xsl:decimal-format name="digit" decimal-separator="."
grouping-separator="," infinity="∞" minus-sign="-" NaN="0"
percent="%" per-mille="μ" zero-digit="0" digit="#"
pattern-separator=";" />
<xsl:output method="text" indent="yes"/>
<xsl:template match="/">
INSERT INTO TABLE(
Column1, Column2, Column3)
VALUES (
bx_item01,
bx_item02,
bx_item03,
bx_item04,
bx_item05,
bx_item06)
</xsl:template>
</xsl:stylesheet>
```

Figure 9:
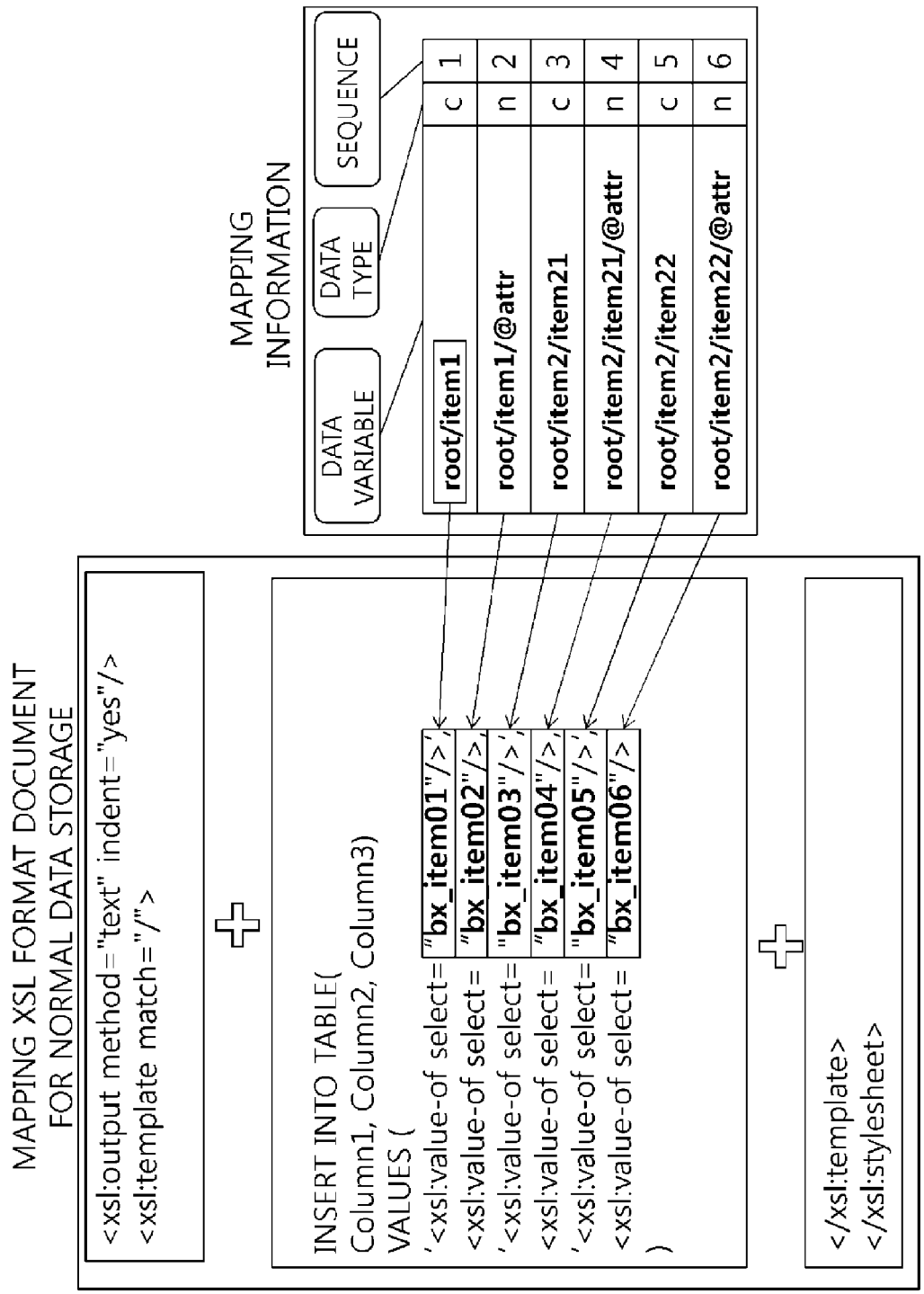
FIG. 9 is a diagram showing a mapping XSL format document for normal data storage according to the present invention.
Figure 10:
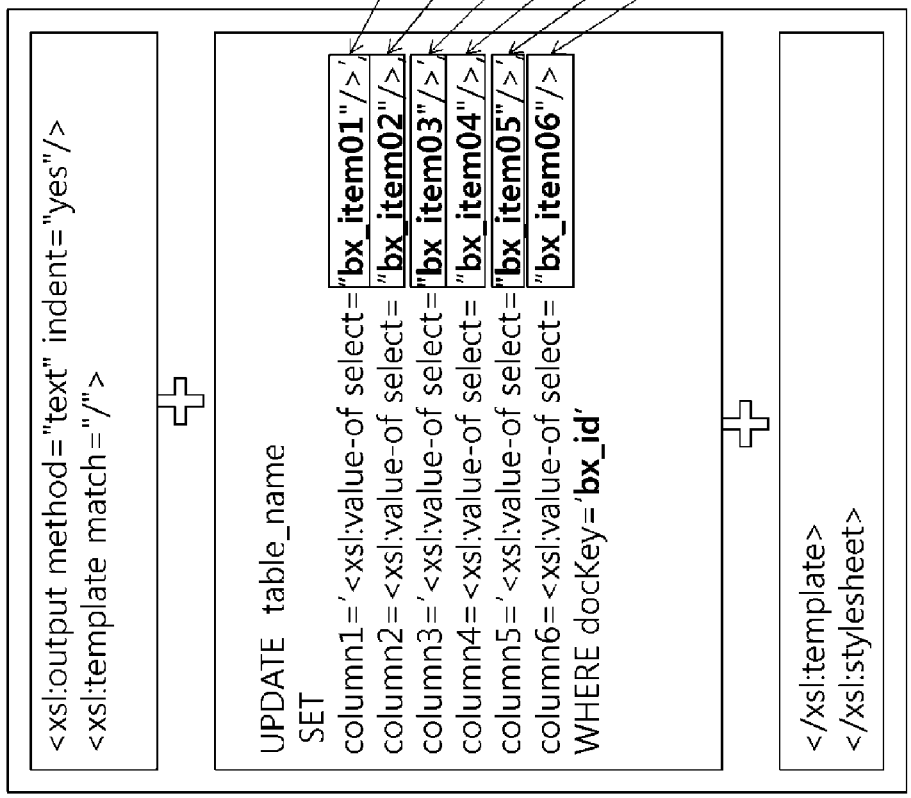
FIG. 10 is a diagram showing a mapping XSL format document for normal data revision according to the present invention.

FIG. 9 is a diagram showing a mapping XSL format document for normal data storage according to the present invention, and FIG. 10 is a diagram showing a mapping XSL format document for normal data revision according to the present invention.

The XSL format document for normal data mapping may include a mapping XSL format document for normal data storage and a mapping XSL format document for normal data revision. The mapping XSL format document for normal data storage is shown in FIG. 9, and the mapping XSL format document for normal data revision is shown in FIG. 10.

In this case, the mapping XSL format document for normal data revision may include a primary key required to retrieve the information of the DB. The primary key may be, for example, the "bx_id" shown in FIG. 10.

The step S22 of designing the XSL format document for repetitive data mapping is the step of designing the XSL format document for repetitive data mapping, which is used when mapping the repetitive data among the structural data of the XML document. The XSL format document for repetitive data mapping is given as follows.

```
<?xml version="1.0" encoding="UTF-8"?>
<xsl:stylesheet xmlns:xsl="http://www.w3.org/1999/XSL/Transform"
version="1.0">
<xsl:decimal-format name="digit" decimal-separator="."
grouping-separator="," infinity="∞" minus-sign="-" NaN="0"
percent="%" per-mille="μ" zero-digit="0" digit="#"
pattern-separator=";" />
<xsl:output method="text" indent="yes"/>
<xsl:template match="/">
<xsl:for-each select="bx_item01">
INSERT INTO TABLE(
Column1, Column2, Column3, Column4)
VALUES (
bx_item02,
bx_item03,
bx_item04,
bx_item05
)
</xsl:for-each>
</xsl:template>
</xsl:stylesheet>
```

Figure 11:
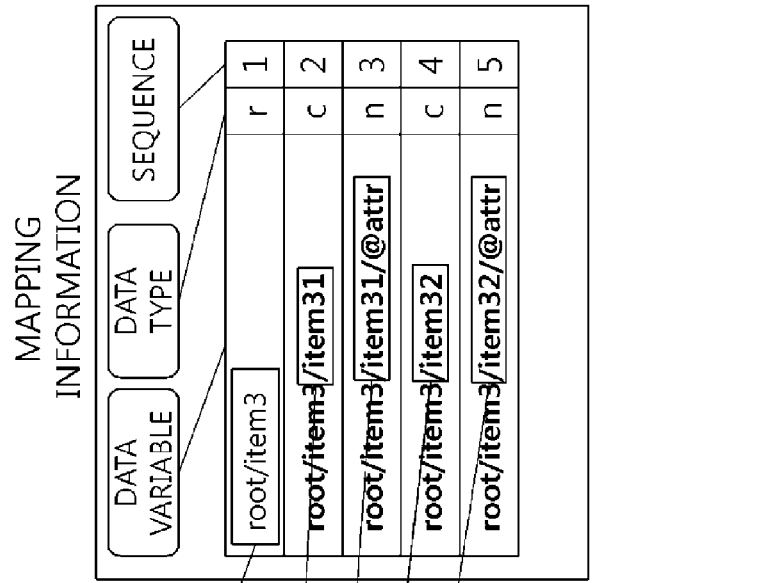
FIG. 11 is a diagram showing a mapping XSL format document for repetitive data storage according to the present invention.
Figure 12:
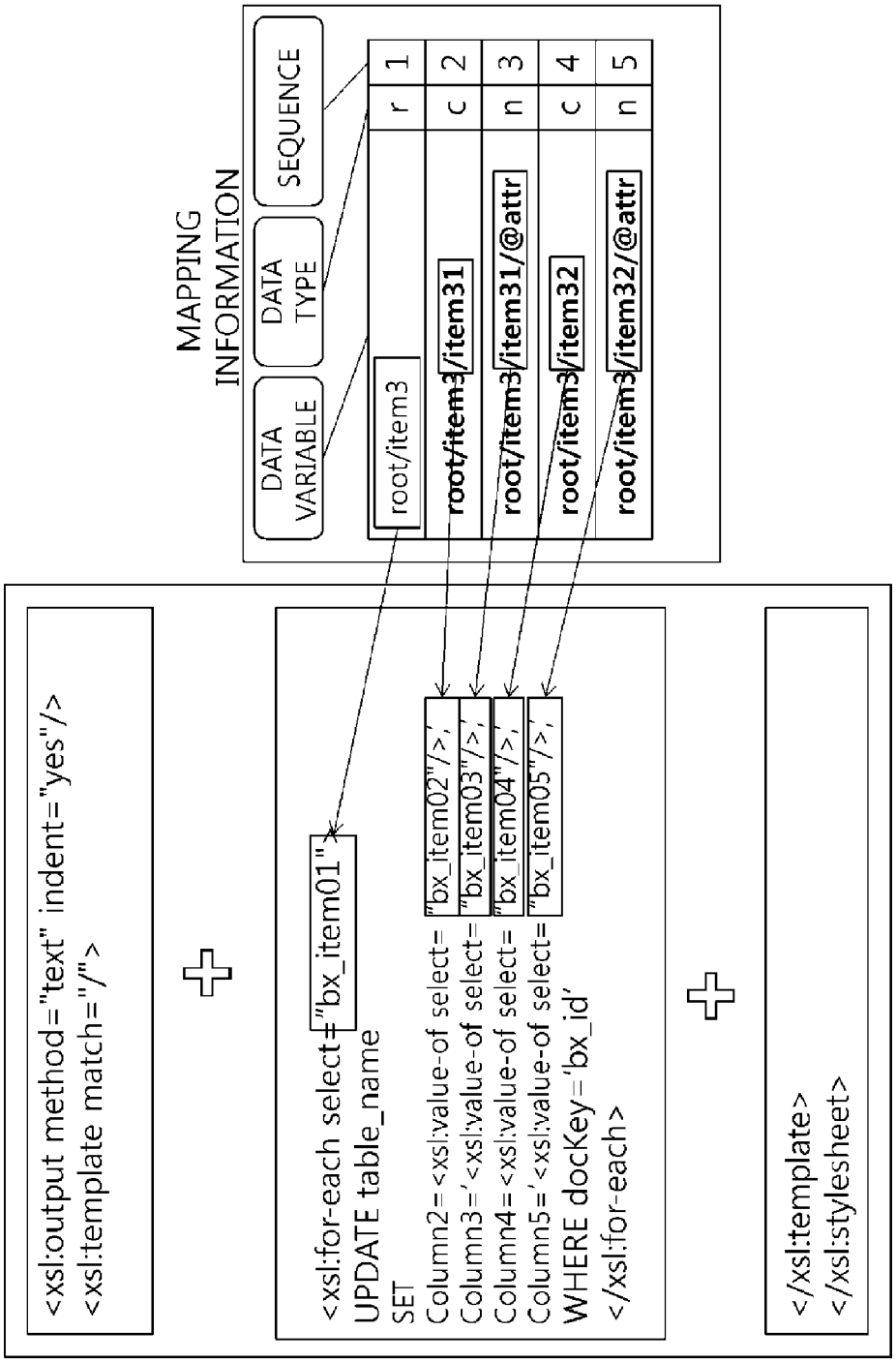
FIG. 12 is a diagram showing a mapping XSL format document for repetitive data revision according to the present invention.

FIG. 11 is a diagram showing a mapping XSL format document for repetitive data storage according to the present invention, and FIG. 12 is a diagram showing a mapping XSL format document for repetitive data revision according to the present invention.

The XSL format document for repetitive data mapping may include a mapping XSL format document for repetitive data storage and a mapping XSL format document for repetitive data revision. The mapping XSL format document for repetitive data storage is shown in FIG. 11, and the mapping XSL format document for repetitive data revision is shown in FIG. 12.

In this case, the mapping XSL format document for repetitive data revision may include a primary key required to retrieve the information of the DB. The primary key may be, for example, the "bx_id" shown in FIG. 12.

At the step S20 of designing the XSL format document for mapping, the XSL format document for mapping may be stored after the replacement parts of data have been modified into a specific format so that the replacement parts are sequentially replaced depending on the mapping information.

In detail, as shown in FIGS. 9 to 12, the XSL format document for mapping is preferably stored after the replacement parts of data have been modified into the format of bx_item01, bx_item02, bx_item03, bx_item04, . . . .

The mapping information creation step S30 is the step of creating mapping information required to map the normal data and the repetitive data of the XML document to the XSL format document for normal data mapping and the XSL format document for repetitive data mapping, respectively.

As shown in FIGS. 9 to 12, the mapping information may include a data variable, a data type, and a mapping sequence.

Here, the data variable refers to XML path information and may be denoted by the absolute path of the XML tags. "c" denotes a character data type, "n" denotes a number data type, and "r" denotes the root of repetitive data.

The step S40 of designing the XSL document for mapping is the step of designing an XSL document for normal data mapping to which the normal data is mapped, and an XSL document for repetitive data mapping to which the repetitive data is mapped, by mapping the normal data and the repetitive data of the XML document to the XSL format document for normal data mapping and the XSL format document for repetitive data mapping, respectively, on the basis of the mapping information.

In detail, the XSL document for normal data mapping designed at the step S40 of designing the XSL document for mapping may be created as follows.

```
<?xml version="1.0" encoding="UTF-8"?>
<xsl:stylesheet xmlns:xsl="http://www.w3.org/1999/XSL/Transform"
version="1.0">
<xsl:decimal-format name="digit" decimal-separator="."
grouping-separator="," infinity="∞" minus-sign="-" NaN="0"
percent="%" per-mille="µ" zero-digit="0" digit="#"
pattern-separator=";" />
<xsl:output method="text" indent="yes"/>
<xsl:template match="/">
INSERT INTO TABLE(
Column1, Column2, Column3)
VALUES (
'<xsl:value-of select="root/item1"/>',
'<xsl:value-of select=" root/item2 /item21"/>',
'<xsl:value-of select=" root/item2 /item22 "/>'
)
</xsl:template>
</xsl:stylesheet>
```

The XSL document for normal data mapping is divided into a head part, a body part, and a bottom part, wherein an output method for the head part is "Text", and portions constituting the body part may be divided into two forms depending on two data types, that is, a character (Char) type and a number type.

In detail, when the portion of the body part is a character type, the body part may be denoted by '<xsl:value-of select="root/item1"/>'. When the portion of the body part is a number type, the body part may be denoted by '<xsl:value-of select="root/item1/@attr"/>'.

Further, the XSL document for repetitive data mapping, which has been designed at the step S40 of designing the XSL document for mapping, may be created as follows.

```
<?xml version="1.0" encoding="UTF-8"?>
<xsl:stylesheet xmlns:xsl="http://www.w3.org/1999/XSL/Transform"
version="1.0">
<xsl:decimal-format name="digit" decimal-separator="."
grouping-separator="," infinity="∞" minus-sign="-" NaN="0"
percent="%" per-mille="µ" zero-digit="0" digit="#"
pattern-separator=";" />
<xsl:output method="text" indent="yes"/>
<xsl:template match="/">
<xsl:for-each select="root/item3">
INSERT INTO TABLE(
Column1, Column2, Column3, Column4)
VALUES (
'<xsl:value-of select="item31"/>,'
'<xsl:value-of select="item32"/>',
'<xsl:value-of select="item33"/>',
'<xsl:value-of select="item34"/>'
)
</xsl:for-each>
</xsl:template>
</xsl:stylesheet>
```

The XSL document for repetitive data mapping is divided into a head part, a body part and a bottom part, wherein an output method for the head part is "Text", and portions constituting the body part may be divided into three forms depending on three data types, that is, a root ("r") type, a character ("c") type, and a number ("n") type.

In detail, when the portion of the body part is the root type, it may be denoted by <xsl:for-each select="root/item3">, when the portion of the body part is the character type, it may be denoted by '<xsl:value-of select="item31"/>', and when the portion of the body part is the number type, it may be denoted by '<xsl:value-of select="item31/@attr"/>'.

Figure 4:
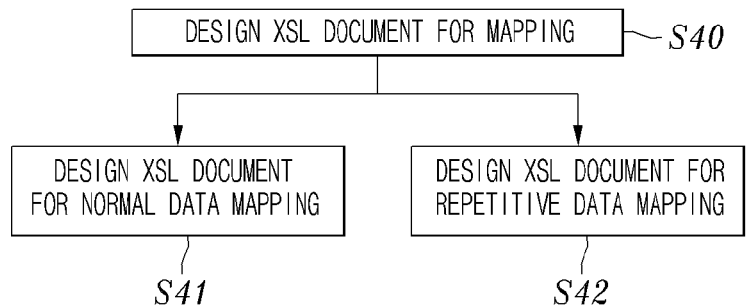
FIG. 4 is a flowchart showing the step of designing an XSL document for mapping according to the present invention.

FIG. 4 is a flowchart showing the step of designing the XSL document for mapping according to the present invention.

As shown in FIG. 4, the step S40 of designing the XSL document for mapping includes the step S41 of designing an XSL document for normal data mapping and the step S42 of designing an XSL document for repetitive data mapping.

Figure 14:
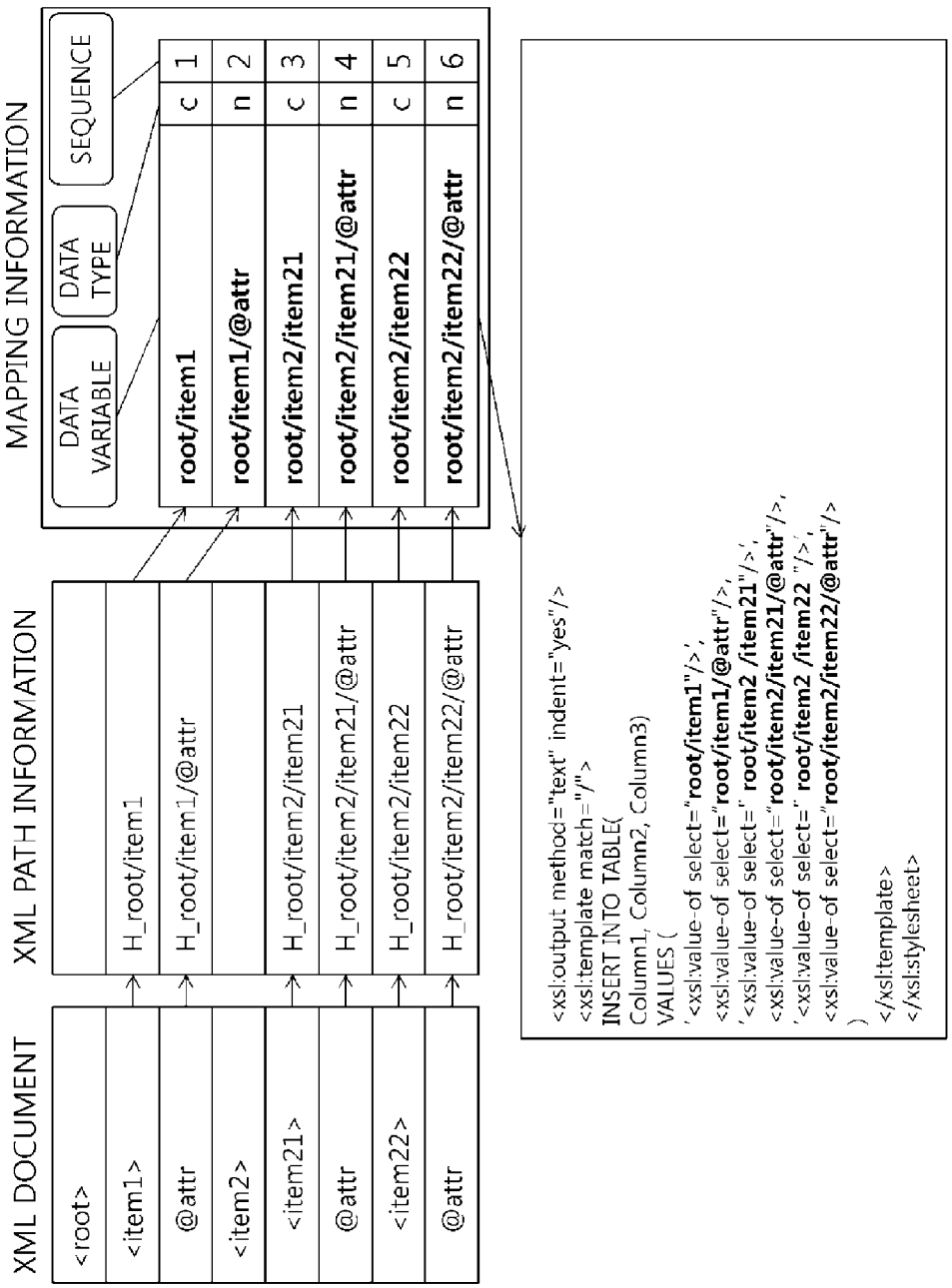
FIG. 14 is a diagram showing a mapping XSL document for normal data storage according to the present invention.
Figure 15:
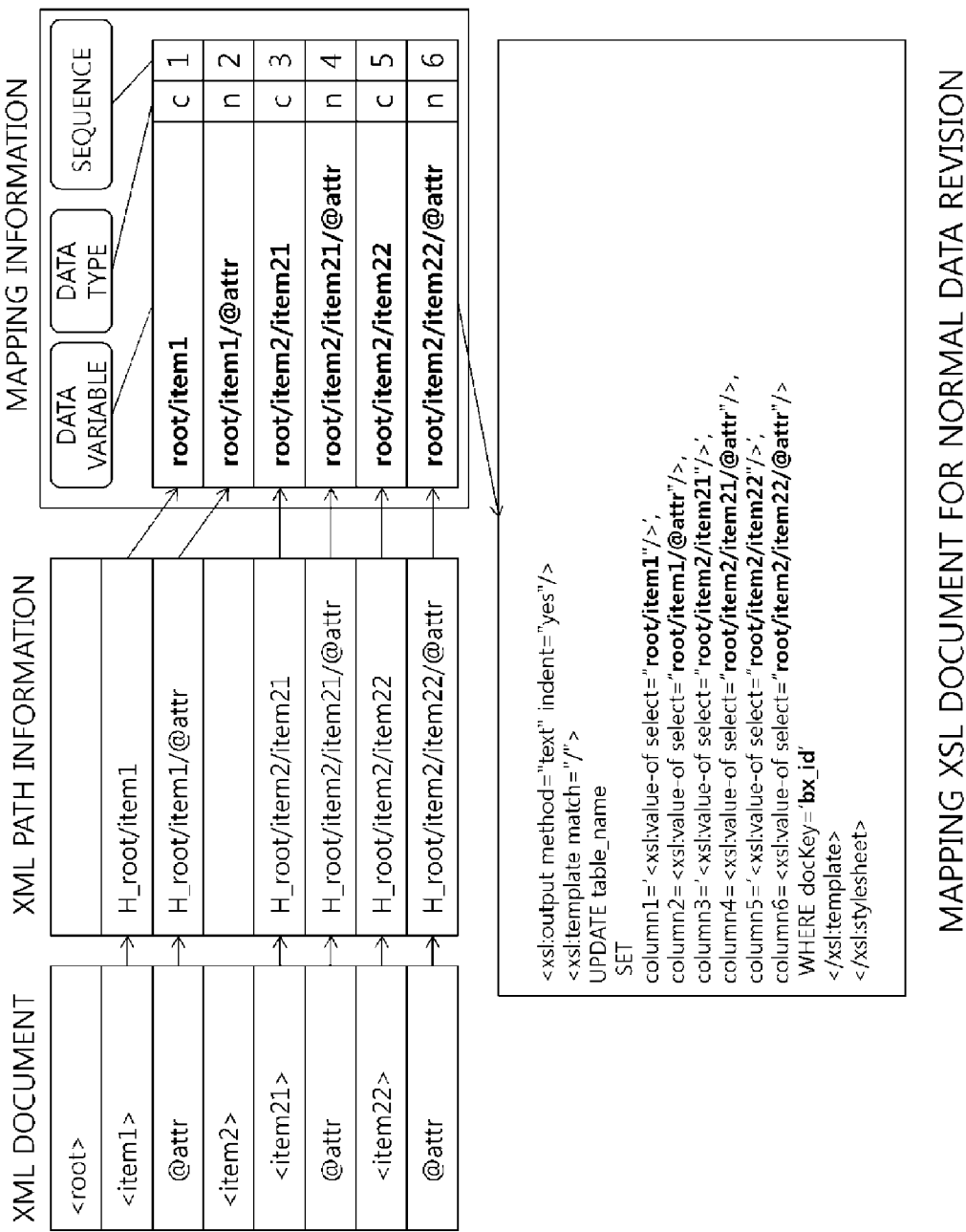
FIG. 15 is a diagram showing a mapping XSL document for normal data revision according to the present invention.

FIG. 14 is a diagram showing a mapping XSL document for normal data storage according to the present invention, and FIG. 15 is a diagram showing a mapping XSL document for normal data revision according to the present invention.

The step S41 of designing the XSL document for normal data mapping is the step of designing the XSL document for normal data mapping by mapping the normal data among the structural data of the XML document to the XSL format document for normal data mapping using the mapping information for normal data.

The XSL document for normal data mapping may include a mapping XSL document for normal data storage and a mapping XSL document for normal data revision. The mapping XSL document for normal data storage is shown in FIG. 14, and the mapping XSL document for normal data revision is shown in FIG. 15.

In this case, the mapping XSL document for normal data revision may include a primary key required to retrieve the information of the DB. The primary key may be, for example, the "bx_id" shown in FIG. 15.

Figure 16:
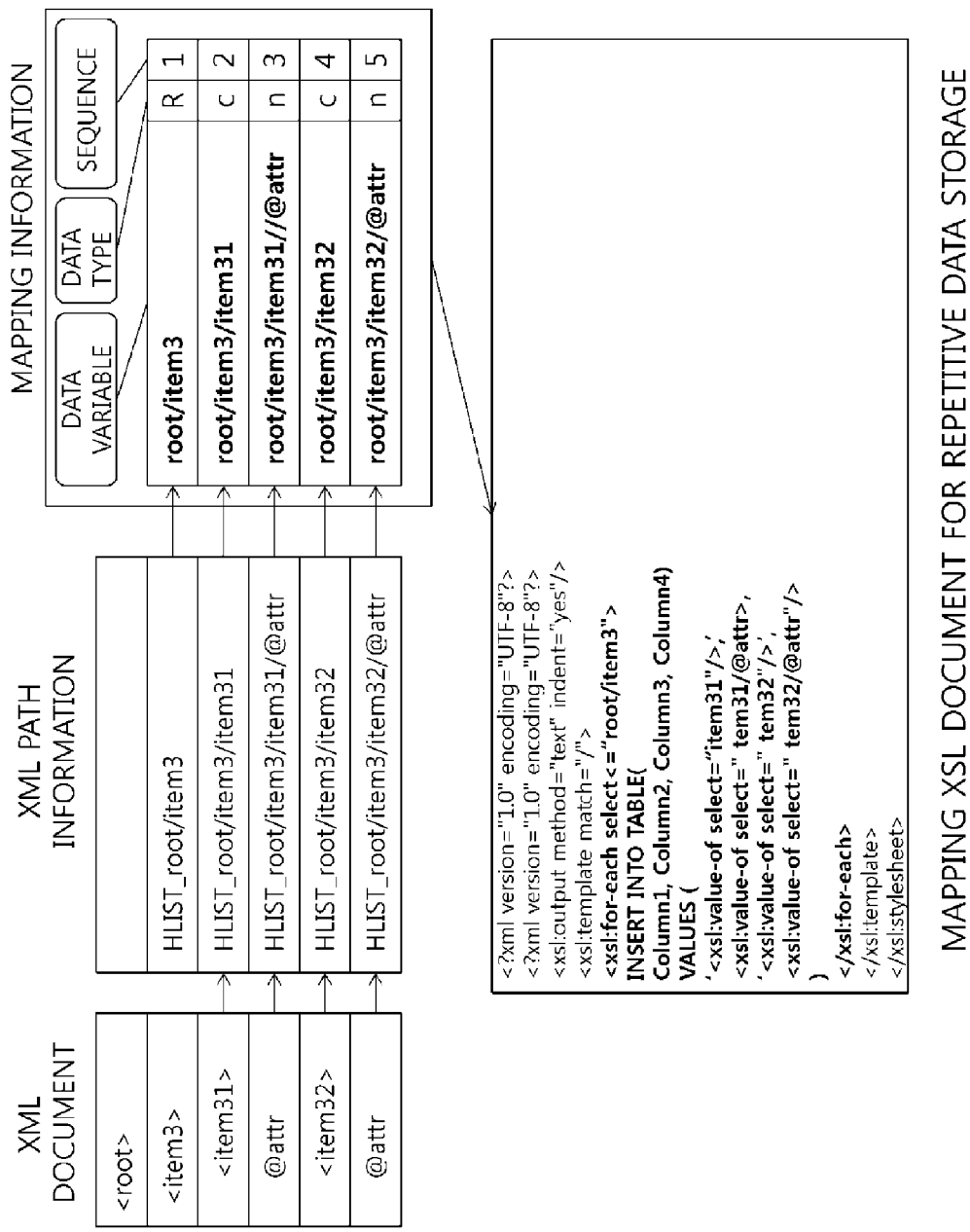
FIG. 16 is a diagram showing a mapping XSL document for repetitive data storage according to the present invention.
Figure 17:
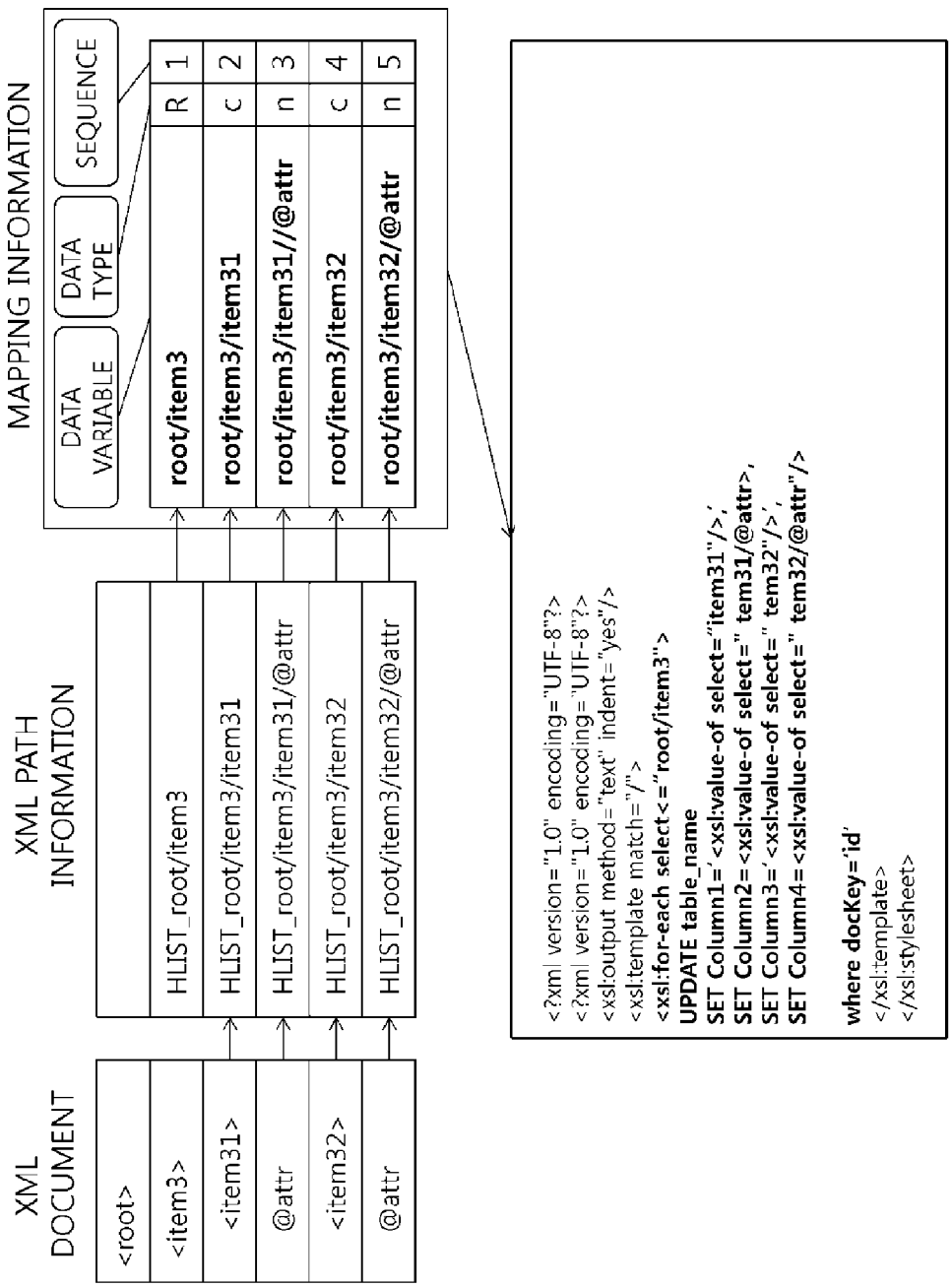
FIG. 17 is a diagram showing a mapping XSL document for repetitive data revision according to the present invention.

FIG. 16 is a diagram showing a mapping XSL document for repetitive data storage according to the present invention, and FIG. 17 is a diagram showing a mapping XSL document for repetitive data revision according to the present invention.

The step S42 of designing the XSL document for repetitive data mapping is the step of designing the XSL document for repetitive data mapping by mapping repetitive data among the structural data of the XML document to the XSL format document for repetitive data mapping using the mapping information for repetitive data.

The XSL document for repetitive data mapping may include a mapping XSL document for repetitive data storage and a mapping XSL document for repetitive data revision. The mapping XSL document for repetitive data storage is shown in FIG. 16, and the mapping XSL document for repetitive data revision is shown in FIG. 17.

In this case, the mapping XSL document for repetitive data revision may include a primary key required to retrieve the information of the DB. The primary key may be, for example, the "bx_id" shown in FIG. 17.

Figure 13:
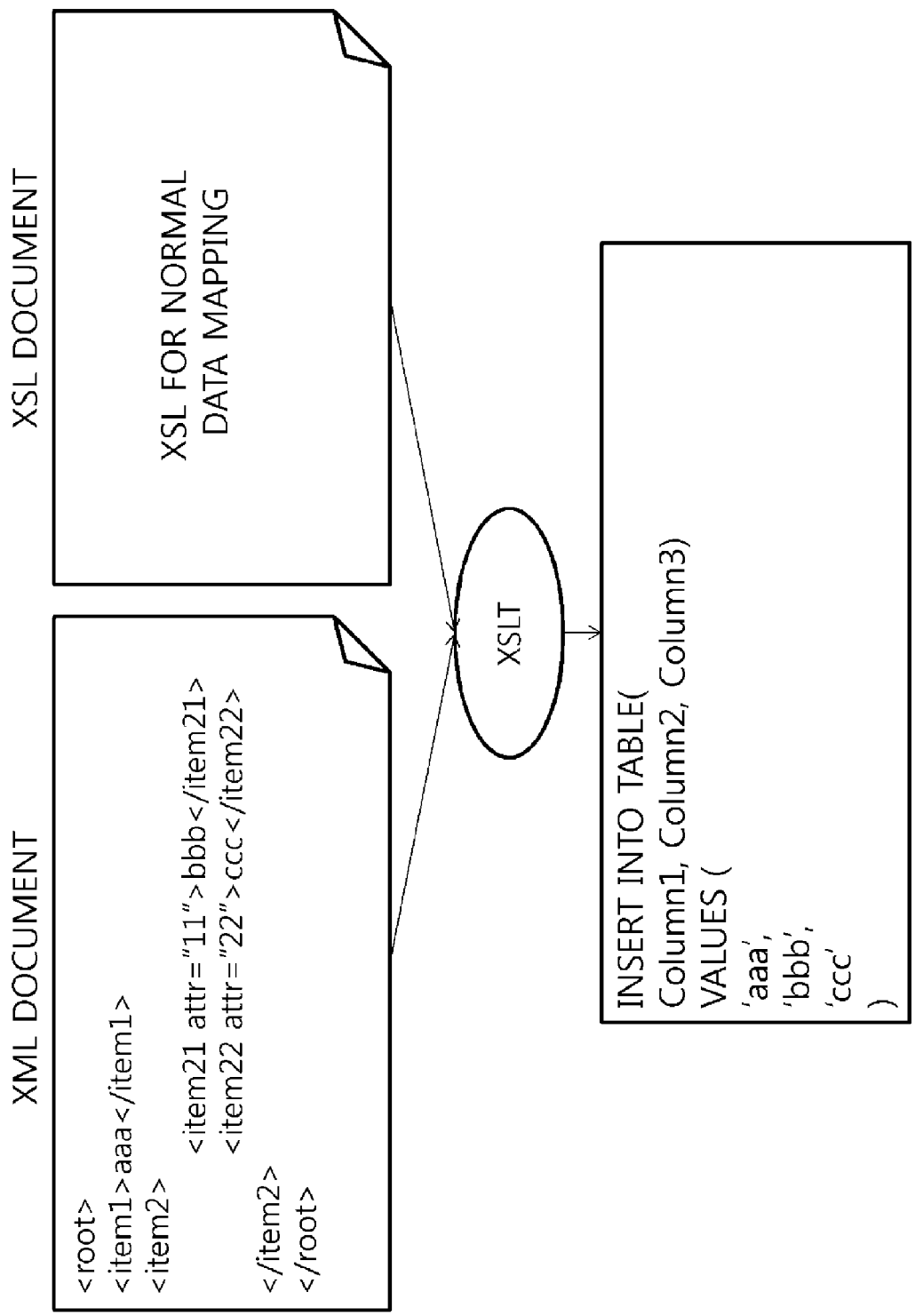
FIG. 13 is a diagram showing an SQL query statement generation step according to the present invention.

FIG. 13 is a diagram showing the SQL query statement generation step according to the present invention.

As shown in FIG. 13, the SQL query statement generation step S50 is the step of performing XSL Transformation (XSLT) on the XML document and the XSL documents for mapping using an XSL transformer, thus generating an SQL query statement required to integrate the normal data and the repetitive data of the XML document with the DB associated with the XML document on the web.

Figure 5:
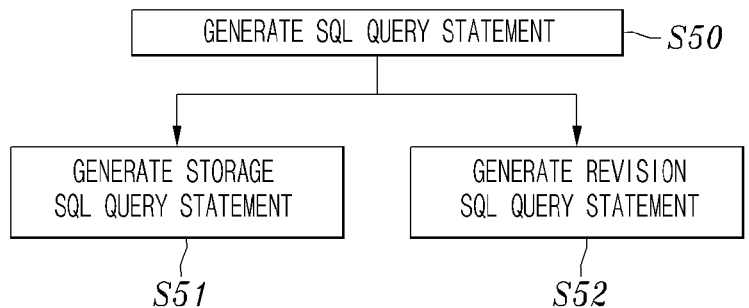
FIG. 5 is a flowchart showing an SQL query statement generation step according to the present invention.

FIG. 5 is a flowchart showing the SQL query statement generation step according to the present invention.

As shown in FIG. 5, the SQL query statement generation step S50 includes a storage SQL query statement generation step S51 and a revision SQL query statement generation step S52.

In this case, the storage SQL query statement generation step S51 is the step of generating a storage SQL query statement required to store the normal data and the repetitive data of the XML document in the DB. The revision SQL query statement generation step S52 is the step of generating a revision SQL query statement required to revise the DB using the normal data and the repetitive data of the XML document.

The DB integration step S60 is the step of integrating the data of the XML document with the DB by executing the SQL query statement on the DB.

Figure 6:
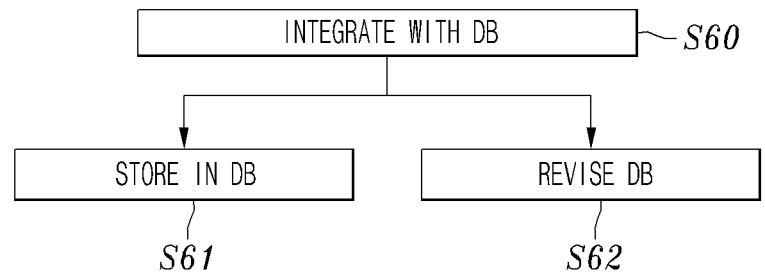
FIG. 6 is a flowchart showing a DB integration step according to the present invention.

FIG. 6 is a flowchart showing the DB integration step according to the present invention.

As shown in FIG. 6, the DB integration step S60 includes a DB storage step S61 and a DB revision step S62.

In this case, the DB storage step S61 is the step of storing the normal data and the repetitive data in the DB by executing the storage SQL query statement, and the DB revision step S62 is the step of revising the DB using the normal data and the repetitive data by executing the revision SQL query statement.

At the DB integration step S60, after the SQL query statement has been executed, the normal data and the repetitive data may be stored in storage sheets. Such storage sheets may be divided into a normal data storage sheet for storing normal data and a repetitive data storage sheet for storing repetitive data.

Hereinafter, a system for performing the method of integrating the data of an XML document with a DB on a web according to the present invention will be described in detail.

Figure 18:
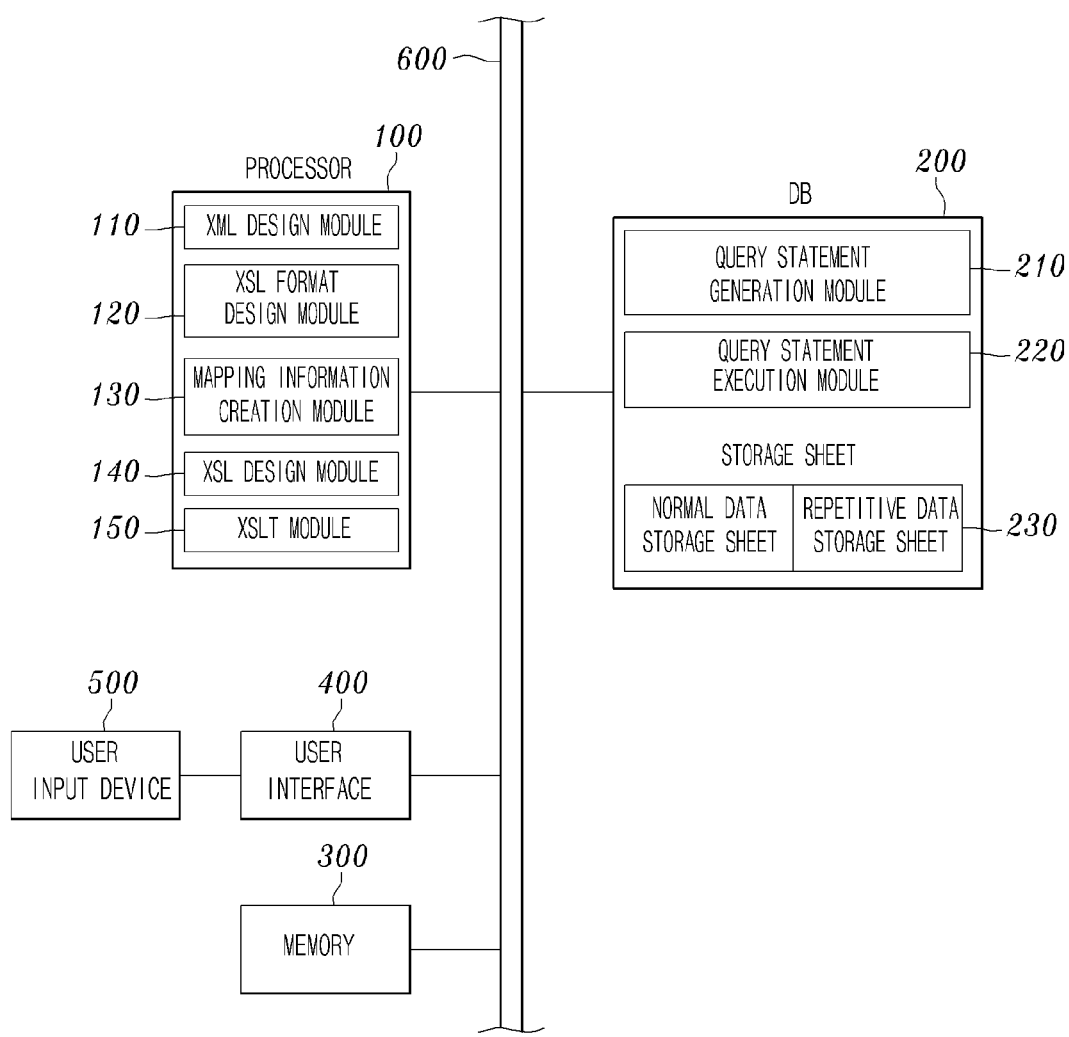
FIG. 18 is a block diagram showing a system suitable for the use of the present invention.

FIG. 18 is a block diagram showing the system suitable for the use of the present invention.

The system for performing the method of integrating the data of the XML document with the DB on the web according to the present invention may be implemented on a general-purpose microcomputer.

As shown in FIG. 18, the system may include a processor 100, a DB 200, memory 300, a user interface 400, and a user input device 500, and all of these components may be connected to an information transfer communication means 600.

The processor 100 executes a program for performing the above-described method of the present invention. In this case, the program may be loaded into memory, or may exist on a storage medium so that the program is loaded into the memory via a suitable storage medium interface.

In detail, the processor 100 includes an XML design module 110, an XSL format design module 120, a mapping information creation module 130, an XSL design module 140, and an XSLT module 150. The DB 200 may include a query statement generation module 210, a query statement execution module 220, and a storage sheet 230.

Here, the XML design module 110 included in the processor 100 may design an XML document provided with user-defined tags by performing the XML document design step S10 according to the above-described method of the present invention. The XSL format design module 120 may design an XSL format document for normal data mapping and an XSL format document for repetitive data mapping by performing the step S20 of designing the XSL format document for mapping.

Further, the mapping information creation module 130 included in the processor 100 may create mapping information required to map the normal data and the repetitive data of the XML document to the XSL format document for normal data mapping and the XSL format document for repetitive data mapping, respectively, by performing the mapping information creation step S30. The XSL design module 140 may design the XSL document for normal data mapping and the XSL document for repetitive data mapping by performing the step S40 of designing the XSL document for mapping. The XSLT module 150 may perform XSLT on the XML document and the XSL documents for mapping, thus allowing the query statement generation module 210 of the DB, which will be described later, to generate an SQL query statement.

Furthermore, the query statement generation module 210 included in the DB 200 may generate an SQL query statement required to integrate the normal data and the repetitive data of the XML document with the DB by performing the SQL query statement generation step S50 in the above-described method according to the present invention. The query statement execution module 220 may store the data of the XML document in the DB or revise the DB using the data of the XML document by performing the DB integration step S60, thus integrating the data of the XML document with the DB. In this case, after the SQL query statement has been executed, the normal data and the repetitive data of the XML document may be stored in the normal data storage sheet and the repetitive data storage sheet of the storage sheet 230.

As described above, the present invention may easily extract the data of an XML document and store the data of the XML document in the DB using a dynamic and gradual method without parsing the XML document having user-defined tags using a Document Object Model (DOM) and without using an adapter configured using programming, and may efficiently integrate data between different DBs, for example, Oracle, Microsoft SQL (MSSQL), DB2, and MySQL, and XML documents by applying the scheme of the present invention to a general-purpose Enterprise Application Integration (EAI) system and system integration and association.

As described above, the method of integrating the data of an XML document with a DB on a web according to the invention is advantageous in that it can dynamically integrate the data of an XML document with a DB by storing the data of the XML document in the DB or by revising the DB using the data of the XML document on the web, on the basis of an XML replacement technology rather than a Document Object Model (DOM).

Further, the present invention is advantageous in that a plurality of data rows may be created from a single XML document and may be integrated with a DB and in that the method of the present invention may be applied to all DBs, for example, Oracle, Microsoft SQL (MSSQL), DB2, MySQL, etc.

Furthermore, the present invention is advantageous in that since an XML document for a web service is used in association with the data of the DB on the web, it can be utilized for system integration, system association, a web service, etc., and in that the data of an XML document received from an external site or system can be integrated with the DB of the system by means of Real-Time Enterprise (RTE)-based system integration without undergoing a programming procedure.

Any of the methods described herein can be implemented by computer-executable instructions in (e.g., encoded on) one or more computer-readable media (e.g., computer-readable storage media or other tangible media). Such instructions can cause a computer system to perform the method.

Any of the computer-readable media herein can be non-transitory (e.g., memory, magnetic storage, optical storage, or the like).

Any of the methods described herein can be implemented by computer-executable instructions stored in one or more computer-readable storage devices (e.g., memory, magnetic storage, optical storage, or the like). Such instructions can cause a computer system to perform the method.

As described above, although the method of integrating the data of an XML document with a DB on a web according to the present invention has been described with reference to the illustrated drawings, it is apparent that the present invention is not limited by the embodiments and drawings disclosed in the present specification, and various modifications and changes may be implemented by those skilled in the art without departing from the technical spirit of the present invention.

What is claimed is:

1. A method of integrating data of an Extensible Markup Language (XML) document with a database (DB) on a web, comprising:
designing an XML document provided with user-defined tags;
designing an Extensible Stylesheet Language (XSL) format document for normal data mapping, which is used when mapping normal text among structural data of the XML document, and an XSL format document for repetitive data mapping, which is used when mapping repetitive text;
creating mapping information required to map the normal text and the repetitive text of the XML document to the XSL format document for normal data mapping and the XSL format document for repetitive data mapping, respectively;
designing an XSL document for normal data mapping to which the normal text is mapped and an XSL document for repetitive data mapping to which the repetitive text is mapped, by mapping the normal text and the repetitive text of the XML document to the XSL format document for normal data mapping and the XSL format document for repetitive data mapping, respectively, using the mapping information;
generating a Structured Query Language (SQL) query statement required to integrate the normal text and the repetitive text of the XML document with a DB associated with the XML document on the web by performing Extensible Stylesheet Language Transformation (XSLT) on the XML document and the XSL documents for mapping using an XSL transformer; and
integrating data of the XML document with the DB by executing the SQL query statement on the DB;
wherein the designing the XSL format document for mapping comprises:
designing the XSL format document for normal data mapping; and
designing the XSL format document for repetitive data mapping,
wherein the XSL format document for normal data mapping comprises a mapping XSL format document for normal data storage and a mapping XSL format document for normal data revision, and
wherein the XSL format document for repetitive data mapping comprises a mapping XSL format document for repetitive data storage and a mapping XSL format document for repetitive data revision.

2. The method according to claim 1, wherein the designing the XML document comprises:
defining an XML document including a preset structure and preset data using the user-defined tags; and
separating the XML document into an XML document for normal data mapping, which is used when mapping the normal text, and an XML document for repetitive data mapping, which is used when mapping the repetitive text.

3. The method according to claim 2, wherein at the defining the XML document, the XML document is implemented such that an absolute path of the user-defined tags is stored as user-defined tag values using an XML tree structure.

4. The method according to claim 2, wherein at the defining the XML document,
when the normal text and the repetitive text that are pieces of structural data of the XML document are indicated on user-defined tag values, they are separately indicated using different indication methods so that the normal text and the repetitive text can be distinguished from each other.

5. The method according to claim 2, wherein at the defining the XML document,
when the user-defined tags of the XML document are defined, if the structural data of the XML document is repetitive text, the repetitive text is differently indicated by attributes.

6. The method according to claim 2, wherein at the defining the XML document,
when attributes of the XML document are defined, the attributes are indicated such that names of the attributes are combined with the user-defined tag values.

7. The method according to claim 1, wherein each of the mapping XSL format document for normal data revision and the mapping XSL format document for repetitive data revision comprises a primary key required to retrieve the information of the DB.

8. The method according to claim 1, wherein at the designing the XSL format document for mapping, the XSL format document for mapping is stored after replacement parts of data have been modified into a specific format so that the replacement parts are sequentially replaced depending on the mapping information.

9. The method according to claim 1, wherein at the creating the mapping information, the mapping information comprises a data variable, a data type, and a mapping sequence.

10. The method according to claim 9, wherein the data variable is XML path information.

11. The method according to claim 1, wherein the designing the XSL document for mapping comprises:
designing the XSL document for normal data mapping; and
designing the XSL document for repetitive data mapping,
wherein the XSL document for normal data mapping comprises a mapping XSL document for normal data storage and a mapping XSL document for normal data revision, and
wherein the XSL document for repetitive data mapping comprises a mapping XSL document for repetitive data storage and a mapping XSL document for repetitive data revision.

12. The method according to claim 11, wherein each of the mapping XSL document for normal data revision and the mapping XSL document for repetitive data revision comprises a primary key required to retrieve the information of the DB.

13. The method according to claim 1, wherein the generating the SQL query statement comprises:
   generating a storage SQL query statement required to store the normal text of the XML document in the DB, wherein the storage SQL query statement required to store the normal text comprises an INSERT INTO TABLE command comprising DB column values according to the normal data mapping;
   generating a storage SQL statement required to store the repetitive text of the XML document in the DB, wherein the storage SQL statement required to store the repetitive text comprises a for-each statement and a nested INSERT INTO TABLE command comprising DB column values according to the repetitive data mapping;
   generating a revision SQL query statement required to revise the DB using the normal text of the XML document, wherein the revision SQL query statement required to revise the DB using the normal text comprises an UPDATE command comprising DB column values according to the normal data mapping; and
   generating a revision SQL query statement required to revise the DB using the repetitive text of the XML document, wherein the revision SQL query statement required to revise the DB using the repetitive text comprises a for-each statement and a nested UPDATE command comprising DB column values according to the repetitive data mapping.

14. The method according to claim 13, wherein the integrating the data of the XML document with the DB comprises:
   storing the normal text and the repetitive text in the DB by executing the storage SQL query statements; and
   revising the DB using the normal text and the repetitive text by executing the revision SQL query statements.

15. One or more non-transitory computer-readable media causing a computing system to perform a method of integrating data of an Extensible Markup Language (XML) document with a database (DB) on a web, the method comprising:
   designing an XML document provided with user-defined tags;
   designing an Extensible Stylesheet Language (XSL) format document for normal data mapping, which is used when mapping normal text among structural data of the XML document, and an XSL format document for repetitive data mapping, which is used when mapping repetitive text;
   creating mapping information required to map the normal text and the repetitive text of the XML document to the XSL format document for normal data mapping and the XSL format document for repetitive data mapping, respectively;
   designing an XSL document for normal data mapping to which the normal text is mapped and an XSL document for repetitive data mapping to which the repetitive text is mapped, by mapping the normal text and the repetitive text of the XML document to the XSL format document for normal data mapping and the XSL format document for repetitive data mapping, respectively, using the mapping information;
   generating a Structured Query Language (SQL) query statement required to integrate the normal text and the repetitive text of the XML document with a DB associated with the XML document on the web by performing Extensible Stylesheet Language Transformation (XSLT) on the XML document and the XSL documents for mapping using an XSL transformer; and
   integrating data of the XML document with the DB by executing the SQL query statement on the DB;
   wherein the designing the XSL format document for mapping comprises:
   designing the XSL format document for normal data mapping; and
   designing the XSL format document for repetitive data mapping,
   wherein the XSL format document for normal data mapping comprises a mapping XSL format document for normal data storage and a mapping XSL format document for normal data revision, and
   wherein the XSL format document for repetitive data mapping comprises a mapping XSL format document for repetitive data storage and a mapping XSL format document for repetitive data revision.

* * * * *